US000002033H

(19) United States

(12) Statutory Invention Registration (10) Reg. No.: US H2033 H

Masak et al. (43) Published: Jul. 2, 2002

(54) METHOD AND MEANS FOR PROVIDING ENHANCED MAIN BEAM NULLING IN ANTIJAMMING ANTENNA

(75) Inventors: Raymond J. Masak, East Northport; Raymond J. Lackey, Oakdale, both of NY (US)

(73) Assignee: The United States of America as represented by the Secretary of the Air Force, Washington, DC (US)

(21) Appl. No.: 06/606,742

(22) Filed: Mar. 1, 1984

(51) Int. Cl.[7] ..... G01S 3/16; G01S 3/28

(52) U.S. Cl. ..... 342/383

(58) Field of Search ..... 343/16 M, 18 E, 343/378, 379, 380, 381, 382, 383; 342/16, 18, 378, 379, 380, 381, 882, 383

(56) References Cited

U.S. PATENT DOCUMENTS

| | | | | |
|---|---|---|---|---|
| 3,766,559 A | | 10/1973 | Butcher et al. | |
| 4,023,172 A | | 5/1977 | Schmidt | 343/16 M |
| 4,097,866 A | | 6/1978 | Frost et al. | |
| 4,170,775 A | | 10/1979 | Masak | |
| 4,177,464 A | | 12/1979 | Masak | |
| 4,316,190 A | * | 2/1982 | Cole | 343/381 |
| 4,516,126 A | * | 5/1985 | Masak et al. | 343/383 |

* cited by examiner

*Primary Examiner*—Daniel T. Pihulic

(57) ABSTRACT

In a microwave communications link, an antijamming antenna system with enhanced main beam nulling is realized by providing gain in the difference port output of a monopulse antenna compared to the sum port. As a consequence interference signals are nulled out at much closer angles to the desired signal than is the case when the gain is the same in both channels. The gain is introduced when a dominant jammer is detected. Detection of a dominant jammer is identified for the conditions in which the monopulse sum channel power level exceeds the sum of the difference channel power levels and the system processor output signal/noise ratio is unsatisfactory.

7 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND MEANS FOR PROVIDING ENHANCED MAIN BEAM NULLING IN ANTIJAMMING ANTENNA

STATEMENT OF GOVERNMENT INTEREST

The invention described herein may be manufactured and used by or for the Government for governmental purposes without the payment of any royalty thereon.

BACKGROUND OF THE INVENTION

This invention relates to antijamming antenna techniques for reducing the vulnerability of line of sight and troposcatter microwave communications links to jamming.

Specifically, the invention comprehends an antenna with an improved gain control circuit for enhancing the null performance of the antenna against a jammer close to antenna boresight.

It has been demonstrated that in existing Defense communications systems there exists the need to protect all directions of arrival of a desired signal against jamming; jamming effectiveness is greatest in the main beam and near-in sidelobe regions of the antenna. Computed jamming/signal ratios for various simulated encounters has showed that an integrated adaptive main beam-sidelobe canceller antenna is required to significantly reduce communication outages due to the various jamming encounters.

Antijamming antenna techniques have been developed which reduce vulnerability of line of sight and troposcatter microwave communications links to jamming. The techniques are incorporated in an antenna system that is configured to adaptively place a null in the direction of a jammer with an arrival angle close to the direction of arrival of a decreased signal (within the main beam) as well as a jammer arriving in the sidelobe region of the main antenna. Spatial discrmination prevents nulling of the desired signal in the absence of jamming an improved signal/jamming ratio for jamming levels comparable to the desired signal level. The antenna system utilized includes an auxiliary antenna that consists of a dual plane, multimode, monopulse feed which replaces the standard feed, a low gain slot array and an omnidirectional antenna.

One problem encountered in the system developed was that of the inability to effectively null jammers that are close to the direction of arrival of the desired signal. In this regard it has been determined, and it is fundamental to the present invention that nulling jammers close to the direction of arrival of the desired signal than is indicated by existing techniques can be achieved at the expense of signal/noise ratio. This represents a trade off that is beneficial for some scenarios.

The method of the present invention of increasing null performance for jammers close to the desired signal DOA is to increase the gain of the monopulse antenna auxiliary difference beams. This can be accomplished spatially or by electronic means. For a specific reflector antenna the aperture size and spatial gain available is already fixed and only electronic gain is available. As indicated above, the penalty for using electronic gain is an increase in the System Noise floor. A particular characteristic of line of sight microwave communication links of the type to which the invention pertains is that they are designated to have large fade margins and therefore the received signal at one of the diversity antennas is usually strong and well above the noise floor. Advantage of this can be taken by the AJ antenna by increasing the electronic gain in the monopulse antenna auxiliary difference beam channels in a controlled manner. This permits nulling a jammer closer to boresight of the antenna. The resulting increase in noise does not degrade system performance in cases where the signal is well above noise floor at one of the diversity antennas.

SUMMARY OF THE INVENTION

The invention comprises an antenna system with an improved gain control circuit for enhancing null; performance of the antenna against a jammer close to antenna boresight. The antenna system is provided with an auxiliary monopulse system having sum azimuth difference and elevation difference ports. An adaptive system senses the auxiliary port outputs in conjunction with the signal/noise ratio of the antenna processor output and increases the gain in the difference circuits in response to certain conditions that indicate the presence of a dominant jammer. A dominant jammer is indicated when the power level in the sum port exceeds the power levels of both difference ports and the signal/noise ratio of the processor output is unsatisfactory.

It is a principal object of the invention to provide a new and improved method for effecting main beam nulling in antijamming antennas.

It is another object of the invention to provide an improved method of nulling out interference signals at angles close to boresight in antijamming antennas.

It is another object of the invention to provide, in an antijamming antenna, means for nulling jammers closer to the direction of arrival of desired signals than has heretofore been possible.

It is another object of the invention to provide an antijamming antenna system having adaptive means for detecting the presence of and nulling out jammers close to boresight.

These together with other features and advantages of the invention will become more readily apparent from the following detailed description when taken in conjunction with the illustrative embodiment in the accompanying drawings.

DETAILED DESCRIPTION OF THE PREFERRED EMBODIMENT

The invention provides enhanced main beam nulling in the antenna system of a line of sight or troposcatter microwave communications link. It comprises a method and means for improving null performance for jammers close to the desired signal direction of arrival.

Figure 1:
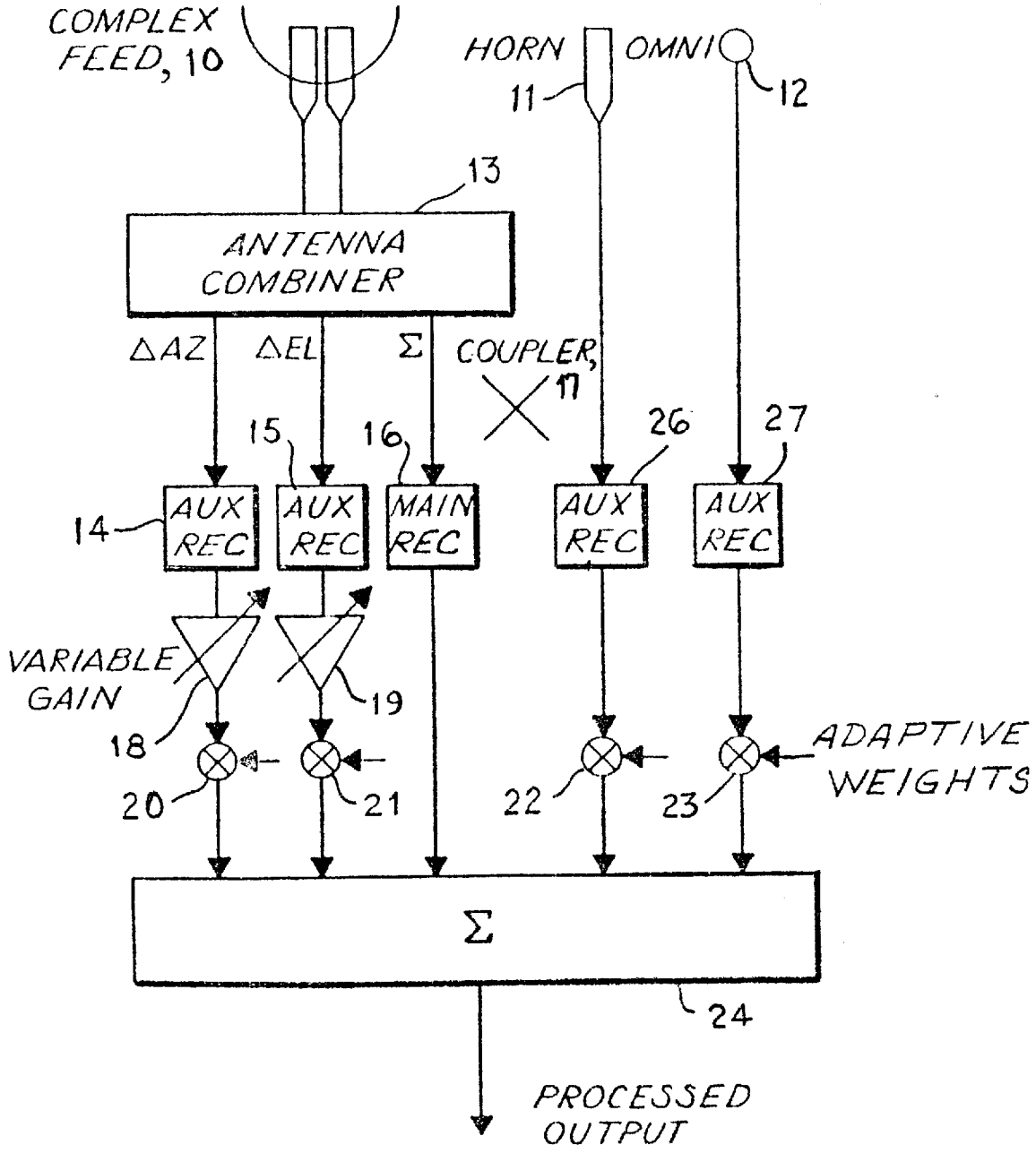
FIG. 1 is a block diagram showing the enhanced main beam processor configuration of the invention.

A block diagram of an antenna configuration of the type to which the invention may be applied is shown in FIG. 1. It comprises a monopulse system that includes complex feed 10, antenna combiner 13, auxiliary receivers 14, 15, main receiver 16, horn (or main) antenna 11, omnidirectional antenna 12, auxiliary receivers 26, 27, adaptive weights 20-23 and processor 24. Variable gains 18, 19 in the azimuth and elevation difference channel of the monopulse system provide additional gain in accordance with the principles of the invention.

In practicing the invention a controlled amount of gain is introduced into the difference ports of the monpulse system by means of variable gains 18 and/or 19. As a result an interference signal can be nulled that is much closer in angle to the desired signal than would be the case when the gain is the same in both channels.

The basic principle of the invention is illustrated in FIGS. 2–5. For these cases a J/N of +60 dB and JIN of +20 dB were used. In developing the curves of: FIGS. 2–5 the desired signal was centered on the peak of the beam while the jammer was moved in azimuth from the beam peak to five degrees away from the peak. The S/J+N ratio is plotted with and without the AJ antenna processor.

Figure 2:
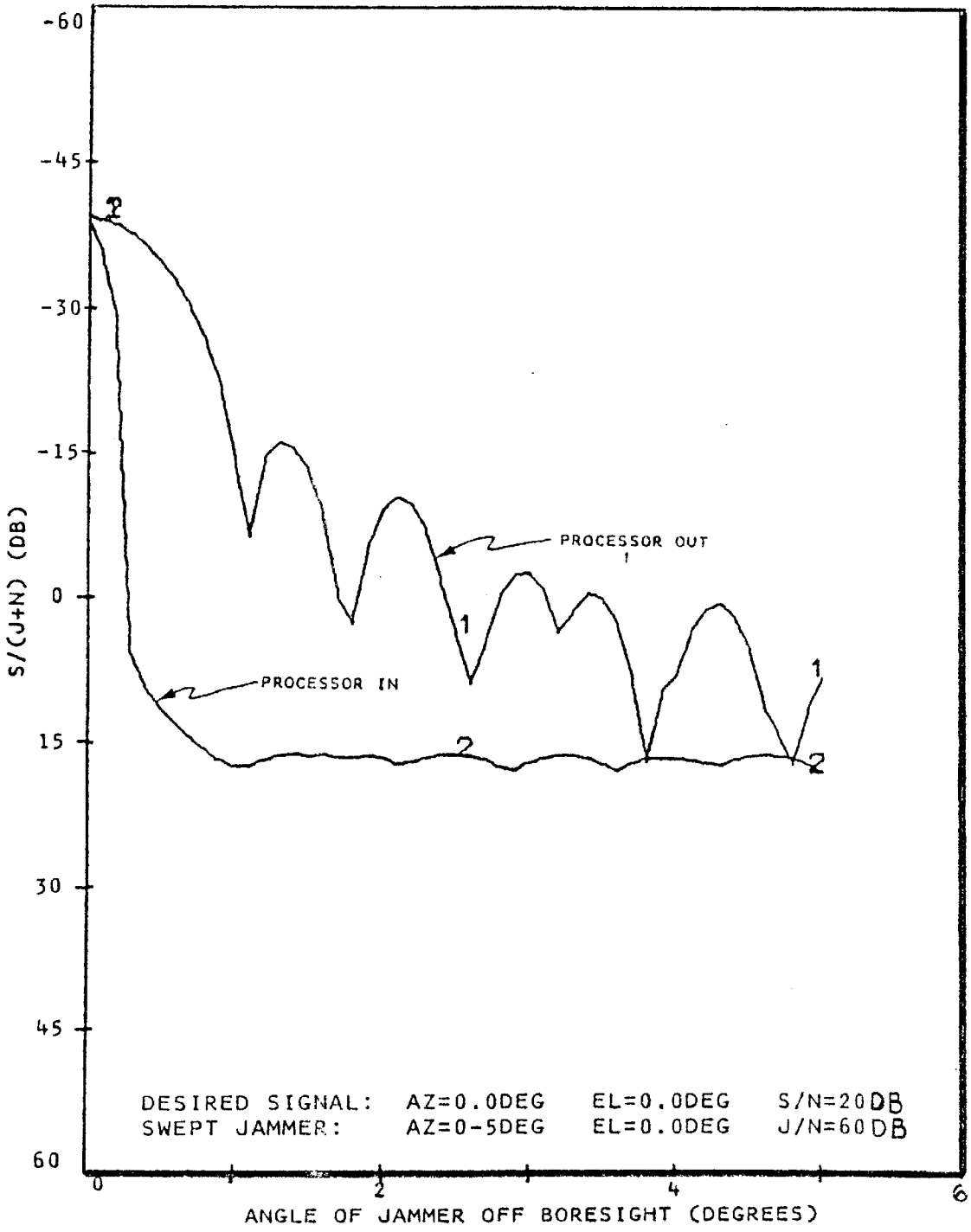
FIG. 2 is a performance curve of S/(J+N) vs angle of jammer off boresight with 0 electronic gain.
Figure 3:
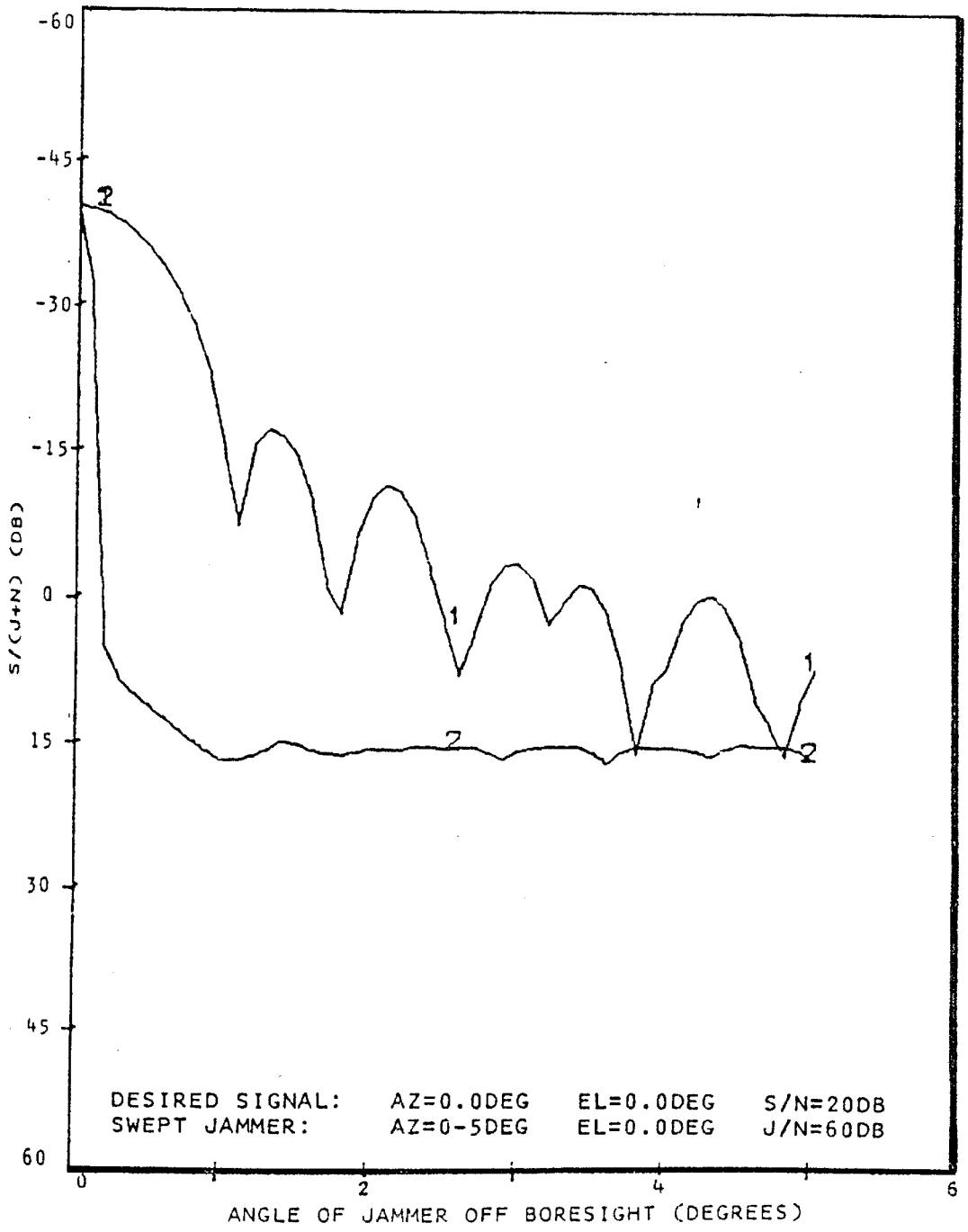
FIG. 3 is a performance curve of S/(J+N) vs angle of jammer off boresight with 3dB electronic gain.
Figure 4:
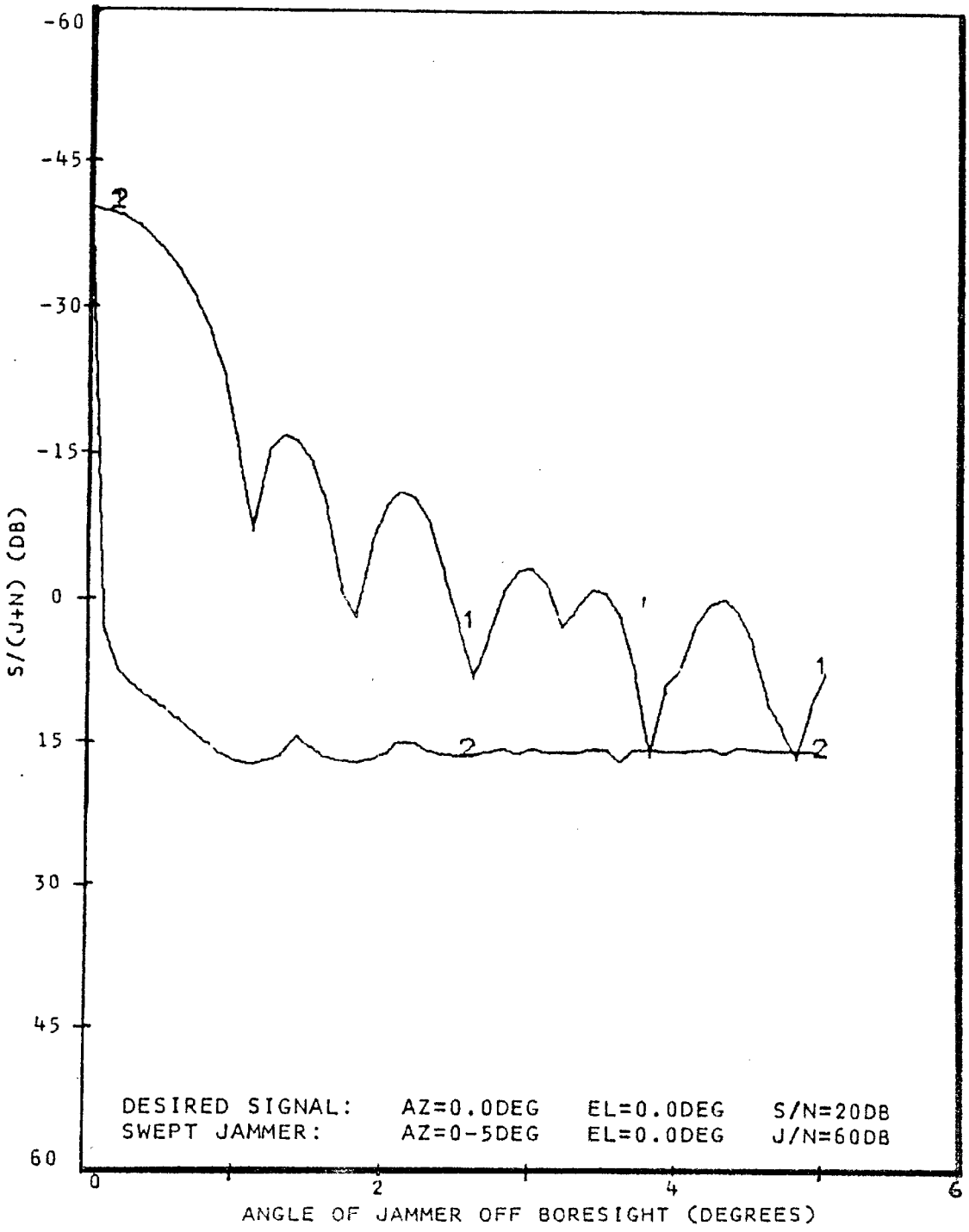
FIG. 4 is a performance curve of S/(J+N) vs angle of jammer off boresight with 6dB electronic gain.
Figure 5:
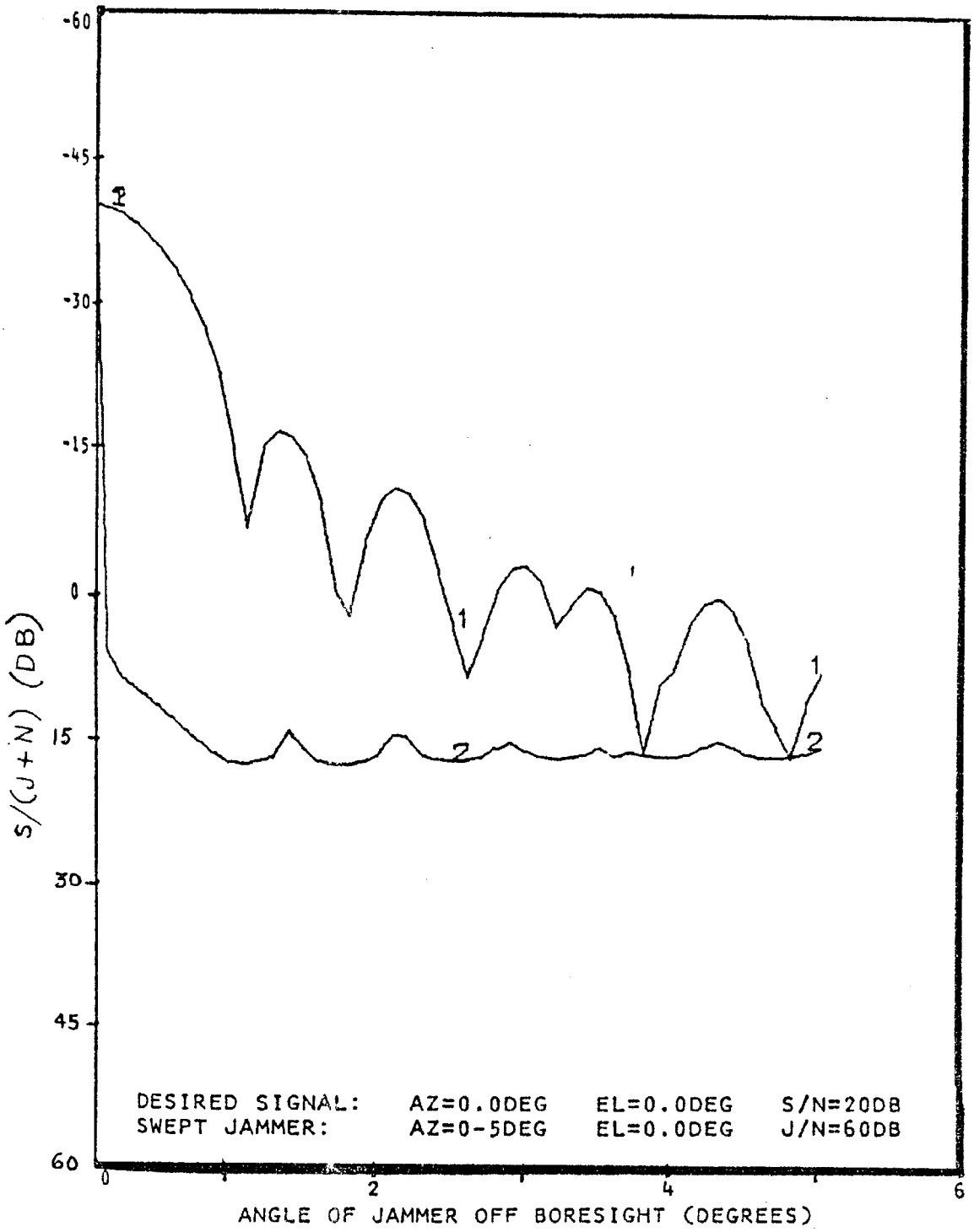
FIG. 5 is a performance curve of S/(J+N) vs angle of jammer off boresight with 9dB electronic gain.

FIG. 2 demonstrates the procedure with no electronic gain in the main auxiliary path. FIG. 3 shows the effect of adding 3 dB of electronic gain in the A AZ auxiliary port. The adapted response in the vicinity of peak has sharpened considerably, that is the jammer can be closer to the direction of arrival (DOA) of the signal and be nulled. The tesult of increasing the gain from 3 dB to 6 dB is shown in FIG. 4. Additional sharpening of the adapted response is noted. Increasing the gain still further to 9 dB (FIG. 5) produces little additional sharpening and begins to affect the sdidelobe region. There are several problems in applying this approach to the system. For example, if a fixed amount of gain were inserted in the difference beam auxiliaries, the effectiveness of the spatial discriminant would be reduced and a loss in S/N would occur for scenarios where the sharpended response is not required. These problems can be alleviated by making use of the jammer detection and performance monitoring ciruits shown in FIG. 6.

Figure 6:
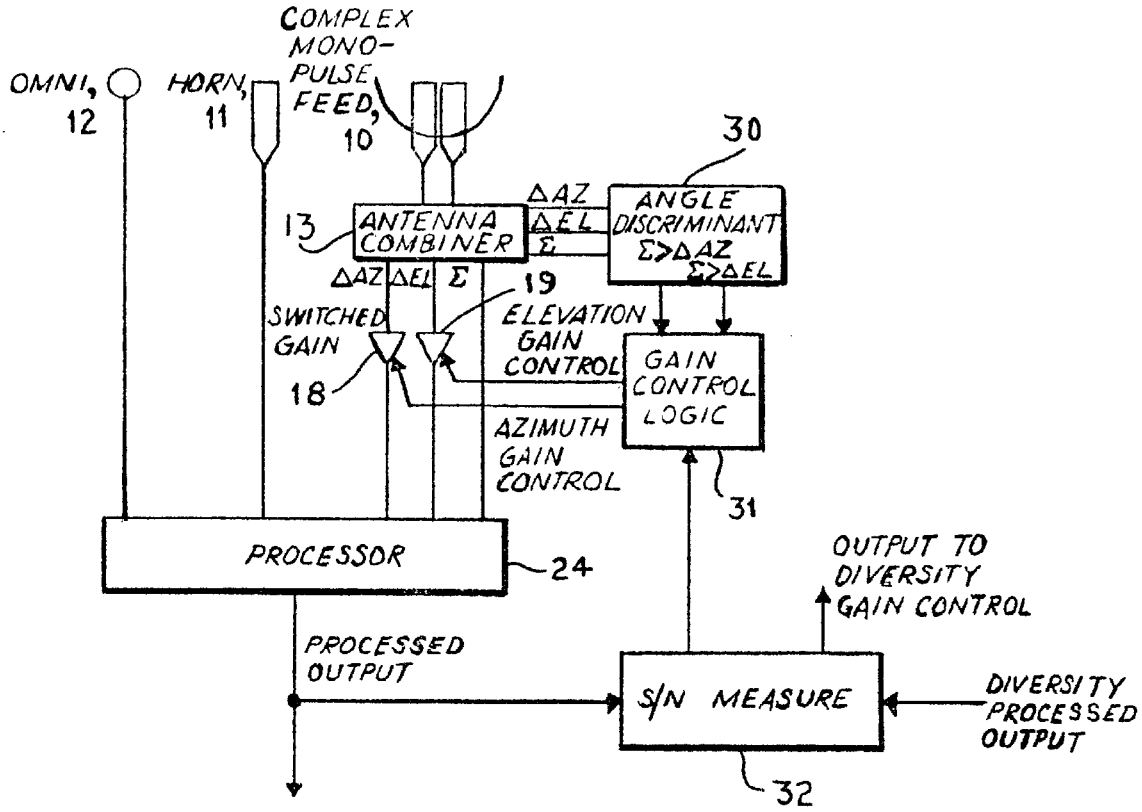
FIG. 6 is a simplified block diagram of the enhanced main beam null configuration of the invention.

FIG. 6 is a simplified block diagram of the enhanced main beam null configuration. In addition to the antenna elements common to those shown in FIG. 1 this configuration includes an angle discriminant 30, a signal/noise measurement device 32 and gain control logic 31. These are conventional radar system components and perform their required functions in the normal way.

The monopulse feed is an ideal direction of arrival indicator. That is the jammer's arrival angle with respect to antenna boresight can be determined accurately for relatively small J/S ratios. A simple but effective approach, to apply the enhanced nulling techniques adaptively, senses the power in the sum port (non-processed) and Az/EL difference ports. If the power in the sum port exceeds the power sensed in both difference ports, it indicates that a signal is in the angular cone around boresight when the normal processor is not effective. The question is whether this is the desired signal alone or is a dominant jammer also present. This is determined by the performance monitoring circuit. If satisfactory S/N is indicated for SIN measure 32, the processor 24 remains in its normal configuration. If S/N is unsatisfactory, it indicates a jammer is within the sector where normal processing is ineffective. These measurements are monitored by a gain control logic circuit 31 which selects the additional gain for enhanced mainbeam null performance as may be required. The gain control logic also provides stabilization control to prevent constant gain switching for pulsed or fading conditions.

While the invention has been described in one presently preferred embodiment it is understood that the words which have been used are words of description rather than words of limitation and that changes within the purview of the appended claims may be made without departing from the scope and spirit of the invention in its broader aspects.

What is claimed is:

1. In an antijamming antenna system having a main antenna, an omnidirectional antenna, a monopulse antenna with azimuth and elevation difference beam ports each having gain and a sum beam port, and a processor receiving signals therefrom and providing a processed output, the method of enhancing main beam nulling comprising the step of increasing gain in said difference beam ports.

2. In an antijamming antenna system having a main antenna, an omnidirectional antenna, a monopulse antenna with azimuth and elevation difference beam ports each having gain and a sum beam port, and a processor receiving signals therefrom and providing a processed output, the method of enhancing main beam nulling comprising the steps of detecting the presence of a dominant jamming signal from the power levels in said monopulse antenna sum and difference beam ports and the signal/noise ratio of said processed output, and increasing gain in said difference beam ports in response thereto.

3. In an antijamming antenna system having a main antenna, an omnidirectional antenna, a monopulse antenna with azimuth and elevation difference beam ports each having gain and a sum beam port, and a processor receiving signals therefrom and providing a processed output, the method of enhancing main beam nulling defined in claim 2 wherein the presence of a dominant jamming signal is detected by the steps of sensing the power level in said monopulse antenna sum beam port, sensing the power levels in said monopulse antenna difference beam ports, determining if the signal/noise ratio of said processed output is satisfactory or unsatisfactory, and identifying the presence of a dominant jamming signal for the condition that the power in the sum beam port exceeds the power in both difference beam ports and the signal/noise ratio of said processed output is unsatisfactory.

4. In an antijamming antenna system having a main antenna, an omnidirectional antenna, a monopulse antenna with azimuth and elevation difference beam ports each having gain and a sum beam port, and a processor receiving signal therefrom and providing a processed output, the method of enhancing main beam nulling defined in claim 3 wherein gain in said difference beam ports is increased by an amount in a range between 3dB and 9dB.

5. In a microwave communications link, an aritijamming antenna system comprising a main antenna, an omnidirectional antenna, a monopulse antenna outputting azimuth and elevation difference signals and sum signals, processor means receiving and processing the outputs of said main antennas, said omnidirectional antenna and said monopulse antenna azimuth and elevation difference signals and sum signals, and providing a processed output therefrom, jamming signal detecting means for detecting and outputting a signal in response to the presence of a dominant jamming signal, said jamming signal detecting means detecting jamming signals from the power levels of said monopulse antenna azimuth and elevation difference signals and sum signals and the signal/noise ratio of said processed output, and gain control means for increasing the gain of said moncpulse antenna azimuth and elevation difference signals in response to the jamming signal detecting means output signal.

6. In a microwave communications link, an antijamming antenna as defined in claim 5 wherein said gain control means increases the gain of said monopulse antenna azimuth and elevation difference signals in response to the conditions in which the power level of said sum signal is greater than the total power of said azimuth and elevation difference signals and the signal/noise ratio of said processed output is less than a preselected threshold.

7. In a microwave communications link, an antijamming antenna as defined in claim 6 wherein said gain control means increases the gain of said monopulse azimuth and elevation difference signals by an amount in a range between 3dB and 9dB.

* * * * *